(12) United States Patent
Stoll et al.

(10) Patent No.: US 6,394,262 B1
(45) Date of Patent: May 28, 2002

(54) IMPACT IDLER ROLLER SYSTEM FOR CONVEYOR BELT

(75) Inventors: Richard D. Stoll; Christopher S. Smith, both of Huntington, WV (US)

(73) Assignee: Richwood Industries, Inc., Huntington, WV (US)

( * ) Notice: Subject to any disclaimer, the term of this patent is extended or adjusted under 35 U.S.C. 154(b) by 0 days.

(21) Appl. No.: 09/536,482

(22) Filed: Mar. 27, 2000

(51) Int. Cl.[7] .............................................. B65G 15/08
(52) U.S. Cl. ...................................... 198/825; 198/842
(58) Field of Search ................................ 198/825, 830, 198/842; 193/35 MD, 35 R (56) References Cited

U.S. PATENT DOCUMENTS

| | | | |
|---|---|---|---|
| 1,266,363 A | | 5/1918 | Wentz |
| 1,303,611 A | * | 5/1919 | Straight |
| 1,353,008 A | | 9/1920 | Wray |
| 1,446,312 A | | 2/1923 | Mellin |
| 1,447,264 A | | 3/1923 | Philips |
| 1,574,511 A | | 2/1926 | Philips |
| 1,577,725 A | | 3/1926 | Jones |
| 1,580,615 A | | 4/1926 | Landahl |
| 1,883,422 A | * | 10/1932 | Strong |
| 2,169,623 A | * | 8/1939 | Weiss et al. |
| 2,169,624 A | * | 8/1939 | Weiss et al. |
| 2,263,506 A | | 11/1941 | Lane |
| 2,484,752 A | * | 10/1949 | Searles |
| 2,546,200 A | * | 3/1951 | Snavely |
| 2,570,364 A | | 10/1951 | Mercier |
| 2,596,499 A | * | 5/1952 | Mercier |
| 2,897,955 A | | 8/1959 | Morrow |
| 3,198,318 A | | 8/1965 | Brown |
| 3,259,227 A | * | 7/1966 | Steinmetz |
| 4,174,031 A | | 11/1979 | MacLeod |
| 4,277,114 A | | 7/1981 | Lindegger |
| 4,738,345 A | * | 4/1988 | Jenkner ............... 193/35 C |
| 4,919,253 A | | 4/1990 | Morrison |
| 4,972,939 A | | 11/1990 | Uttke et al. |
| 5,025,917 A | | 6/1991 | Smith et al. |
| 5,028,054 A | | 7/1991 | Peach |
| 5,038,924 A | | 8/1991 | Stoll ..................... 198/823 |
| 5,103,967 A | | 4/1992 | Stoll ..................... 198/823 |
| 5,188,214 A | | 2/1993 | Uttke et al. |
| 5,337,875 A | * | 8/1994 | Lee ...................... 193/35 R |
| 5,383,549 A | | 1/1995 | Mayer |
| 5,564,557 A | | 10/1996 | Spencer |

FOREIGN PATENT DOCUMENTS

| | | |
|---|---|---|
| DE | 1078830 | 3/1955 |
| DE | 2308504 | 8/1974 |
| GB | 822085 | 10/1959 |

* cited by examiner

*Primary Examiner*—Kenneth W. Noland
(74) *Attorney, Agent, or Firm*—Biebel & French (57) ABSTRACT

A modular roller conveyor system in combination with a conveyor belt and load impact zone for loading material on the conveyor belt. The modular roller conveyor system includes an elongated support member extending transversely of a direction of conveyance for the conveyor belt, and a plurality of modular roller units located in end-to-end abutting engagement with each other on the support member. Each modular roller unit includes a roller support frame having an elongated base portion and upwardly extending end plates at opposing ends of the base portion supporting a shaft and a rotatable shell in supporting engagement with an underside of the conveyor belt. The base portion includes slots extending in the direction of elongation of the base portion, and the support member includes upwardly extending cooperating structures engaging within the slots whereby each modular roller unit is supported for sliding movement in a direction transverse to the direction of conveyance of the conveyor belt to provide a reduction of forces exerted on each modular roller unit through movement of the roller units in response to material impact loads on the conveyor belt.

18 Claims, 5 Drawing Sheets

IMPACT IDLER ROLLER SYSTEM FOR CONVEYOR BELT

BACKGROUND OF THE INVENTION

1. Field of the Invention

The invention relates to belt-type conveyor systems, and more particularly to conveyor systems which carry bulk materials, such as for carrying crushed stone, gravel, coal and the like.

2. Related Prior Art

In known conveyor systems for carrying bulk materials, upper runs of conveyor belts are supported on conveyor belt idlers, which form a particular troughing angle with the upper run of the belt. Such conveyor systems have a loading or impact zone, where the material to be carried by the belt is loaded onto the belt surface. The force of the loading of the material, at the loading zone, applies a particularly high stress to the belt and to the belt supporting idlers.

Commonly, special idler rolls are used in the loading zone, known as impact rollers, which are specially constructed to absorb the loading impact forces. An impact idler assembly is a heavy duty version of the normal conveyor belt idler, in which the rollers are more resistant to impact loading. The rollers are usually three in number, that is, two side rollers and a bottom roller, mounted for rotation on a common support frame, and the rollers may be formed with a cushioning surface, such as in the form of a stack of discs, to resist impact. The two side rollers are oriented at an upwardly extending angle, relative to the center roller, such that the outer rollers extend upwardly toward the lateral edges of the conveyor belt to define a trough area for retaining the material conveyed by the conveyor belt. Thus, the conventional idler roller assembly consists of a series of three transversely oriented individual rollers mounted or supported in end-to-end relation on a common transverse support or saddle frame, and mounted so that the running surfaces of the rollers define the desired troughing angle.

Impact rollers are, themselves, subject to premature and often unpredictable failures. For example, the idler bearings may fail due to the high loading or due to spill-overs or contamination from the material being carried, or from dust. Several factors are known to contribute to the failure of idler rollers. For example, the length of the rollers required to support the conveyor belt is such that deflection of the shaft supporting the roller can occur with application of a force from the load carried by the conveyor belt, resulting in a torque force at the supporting bearings near the ends of the rollers, increasing the wear forces on the bearings. In addition, deflection of the roller shafts cause distortion of the seals located adjacent the bearings at the ends of the rollers, thereby providing an entry point for debris or dust which subsequently contaminates and increases wear of the bearings.

Additionally, the three roller design for defining the troughing of the conveyor belt imparts a sharp corner at the transition between each of the outer rollers and the center roller. This sharp corner promotes premature belt wear, further reducing the operating life for the conveyor system before repair is required.

Also, in the event that it should become necessary to repair or replace one or more of the idler rollers, this usually requires a lengthy shut down of the conveyor since the rollers are provided with fixed mounting points on a rigid structure, and replacement of a roller typically requires lifting the roller out of a bracket. Thus, removal of a roller for inspection or replacement is a time consuming process resulting in a substantial loss of operating time for the conveying system.

A need exists for an improved impact idler roll system which provides extended roll life and reduces belt wear. Additionally a need exists for an idler roll system which facilitates inspection and replacement of idler rolls and reduces down time for conveyor systems.

SUMMARY OF THE INVENTION

The present invention provides an idler roller conveyor system, and more particularly a modular roller construction for use in the impact zone of a conveyor system adapted to handle bulk materials deposited on the top run of a conveyor belt supported by the idler rollers.

The modular roller conveyor system of the present invention comprises an elongated support member extending transversely of a conveyor belt run and supporting a plurality of idler roller modules, each module being a self contained unit supported independently on the support member.

Each roller module comprises a support shaft defining a longitudinal axis of rotation, and a shell supported on the support shaft for rotation about the longitudinal axis. The roller module further includes a frame for supporting the support shaft wherein the frame includes first and second end plates engaging opposing first and second ends of the support shaft, and the first and second plates are rigidly affixed to and extend upwardly from a base portion extending parallel to the longitudinal axis. The base portion includes an attachment structure including a pair of elongated, spaced slots extending upwardly into the base portion substantially between the first and second end plates. The slots are adapted to receive upwardly extending cooperating members, having a profile corresponding to the profile of the slots, which are formed on the support member.

The roller modules are mounted to the support member by sliding the modules onto the upwardly extending cooperating members from a transverse side of the support member. The roller modules are positioned across the support member in end-to-end abutting engagement with each other in such a manner as to permit a degree of endwise movement of the roller modules relative to the support member, as well as a certain degree of vertical movement.

The support member is configured with an upwardly concave shape such that the roller modules define a trough shape for supporting the conveyor belt, with the outer lateral edges at a higher elevation than the central portion of the conveyor belt in order to facilitate retention of material on the conveyor belt.

By providing each roller module with an individual pair of end support plates and supporting base portion, each roller shell is supported completely independently of the other rollers and is therefore less constrained from movement in response to impact loads or other forces exerted by materials on the conveyor belt. In this manner, forces from the material loads are permitted to be distributed across the rollers through the limited movement of the roller modules.

In addition, the modular roller conveyor system is provided with five to seven rollers extending transversely across the width of the conveyor belt. In accordance with this design, a shorter support shaft for the roller shell is required, minimizing deflection of the roller shaft and thereby reducing wear on bearings supporting the roller shell for rotation relative to the shaft. The reduced deflection of roller further permits an improved seal to be used with the present roller module, including a labyrinth seal having a close tolerance of approximately 0.0050 inches gap between inner and outer members of the labyrinth seal to substantially preclude intrusion of debris and/or dust to the bearings.

The rollers are further provided with discs or rings formed of an elastomeric material, such as rubber, positioned around the shells for engagement with the lower surface of the upper run of the conveyor belt. The rings or discs provide a cushioning to impact loads exerted by bulk material being deposited on the conveyor belt in the impact zone. The modular roller conveyor system of the present invention thus provides a three-way cushioning of impact loads on the conveyor belt including cushioning provided by 1) the covering of elastomeric material on the roller shells, 2) the roller support frame providing a force absorbing structure, and 3) the movable connection of the roller modules on the support member facilitating distribution of forces across the modular roller conveyor system.

It is accordingly an important object of this invention to provide an impact idler assembly, for belt type material conveying systems, which may be used in place of conventional three roller impact idler systems.

Another object of the present invention is to provide an impact idler roller system which provides improved roller life and belt wear, and which further facilitates inspection and replacement of rollers while minimizing operating system down time.

Other objects and advantages of the invention will be apparent from the following description, the accompanying drawings and the appended claims.

DETAILED DESCRIPTION OF THE PREFERRED EMBODIMENT

Figure 1:
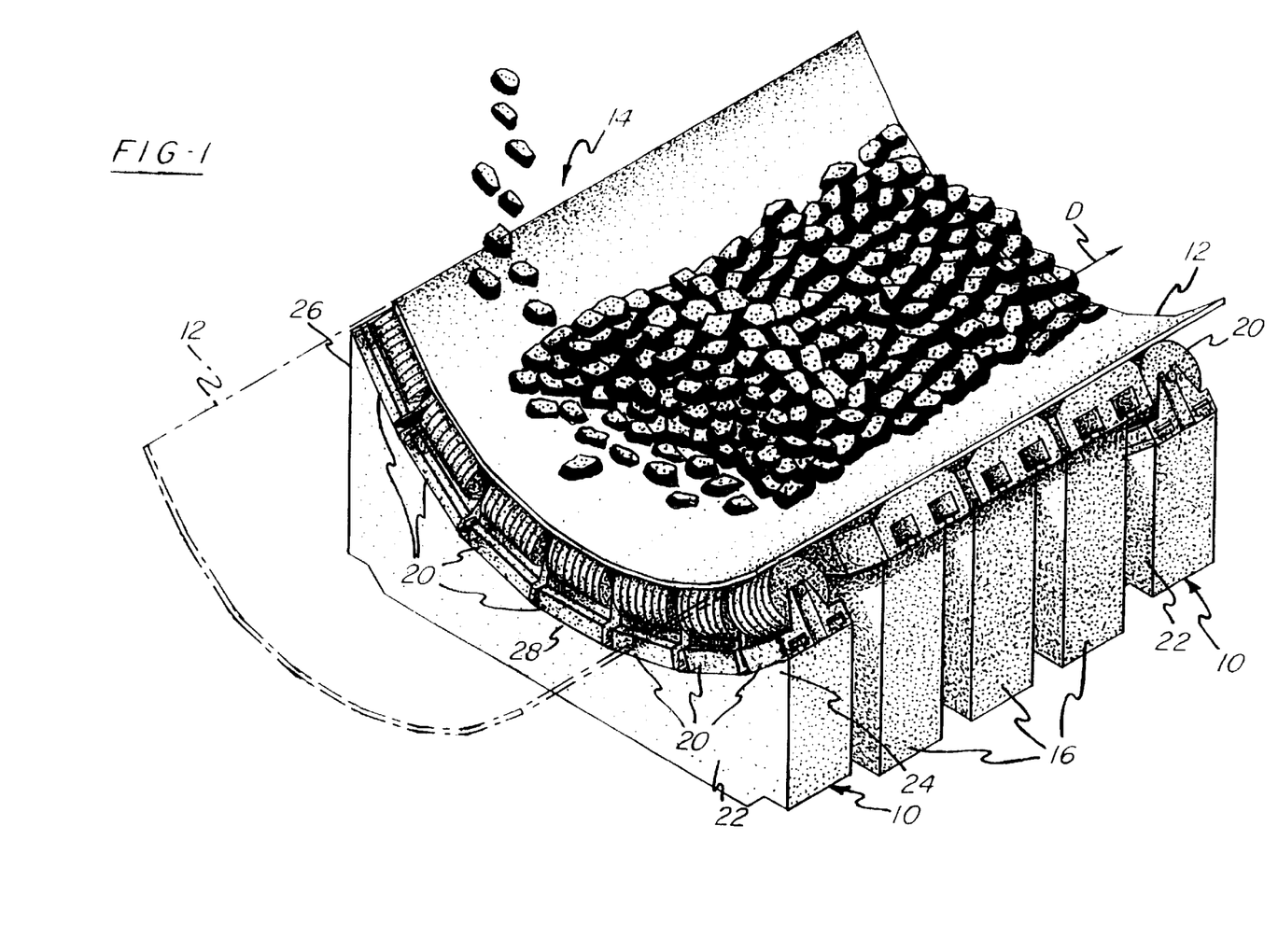
FIG. 1 is a perspective view of a load impact zone incorporating the impact idler roller system of the present invention.

Referring initially to FIG. 1, the present invention provides a modular roller conveyor system 10 in combination with a conveyor belt 12 and load impact zone 14 for loading material onto the conveyor belt. The load impact zone 14 typically includes a plurality of impact saddle structures 16, such as three to eight impact saddle structures 16, and an impact idler structure at either end of the impact saddle structures 16 as is now provided by the modular roller conveyor system structures 10. The impact saddle structures 16 may be constructed in accordance with the structure disclosed in U.S. Pat. No. 5,103,957, commonly owned with the present application, and incorporated herein by reference.

Figure 2:
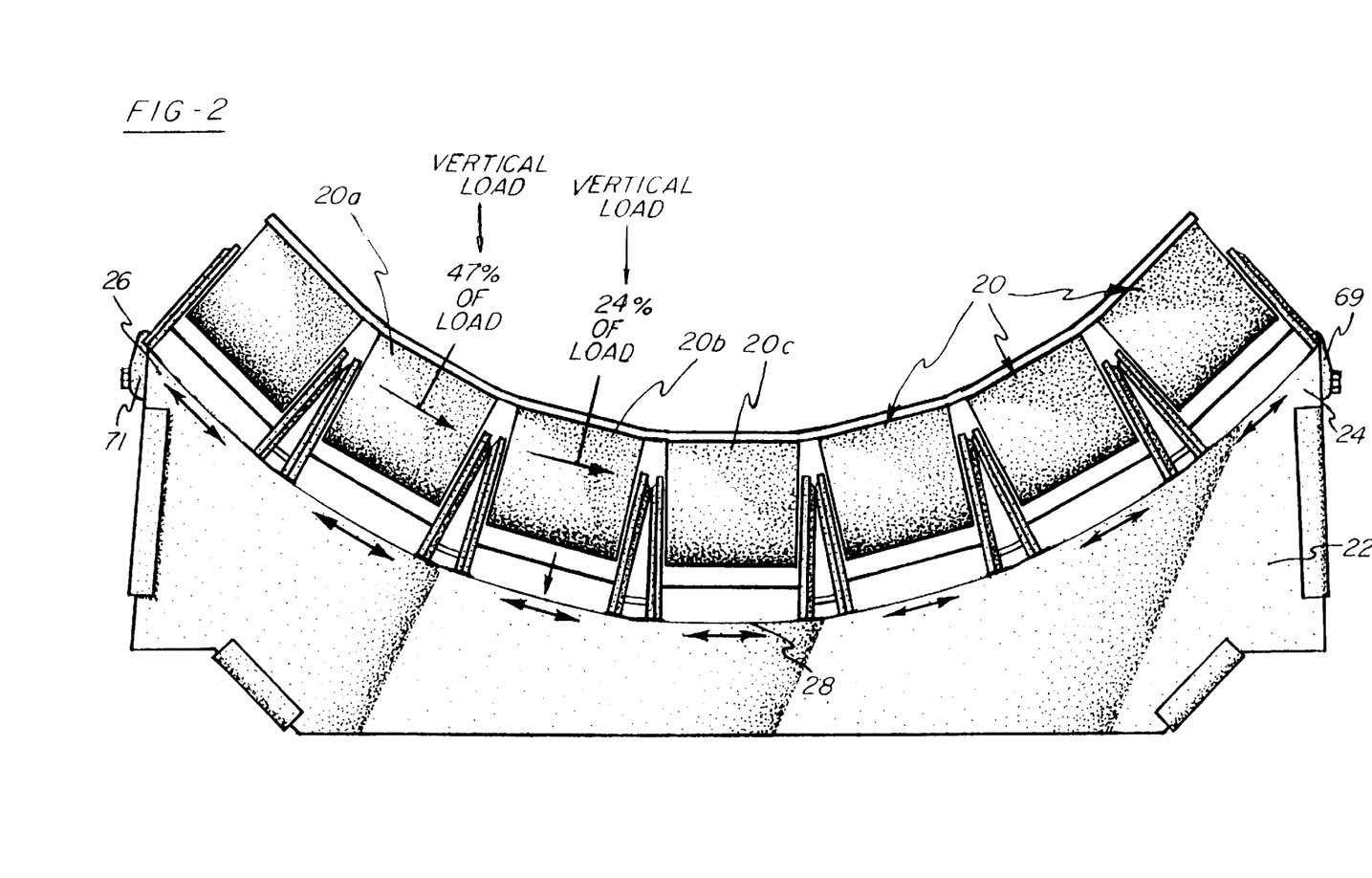
FIG. 2 is a front elevational view of the impact idler roller system.

Referring to FIG. 2, the modular roller conveyor system 10 includes a plurality of identical roller modules 20 which are supported on a support member 22 wherein the support member 22 defines a substantially rigid support structure extending transversely of the direction of travel D of the conveyor belt 12. The support member 22 is formed with an upward curvature with the outer lateral ends 24, 26 of the support member being at a higher elevation than the center section 28 of the support member 22. A sufficient number of roller modules 20 are supported on the support member to provide a continuous contour curve for supporting the belt 12 that closely matches the profile of the impact saddle structures 16, and preferably the relative angle between adjacent modules is approximately 14° whereby formation of sharp creases in the conveyor belt 12 are avoided, and a smooth transition between the modular roller conveyor systems 10 and the adjacent impact saddle structure 16 is provided.

Figure 3:
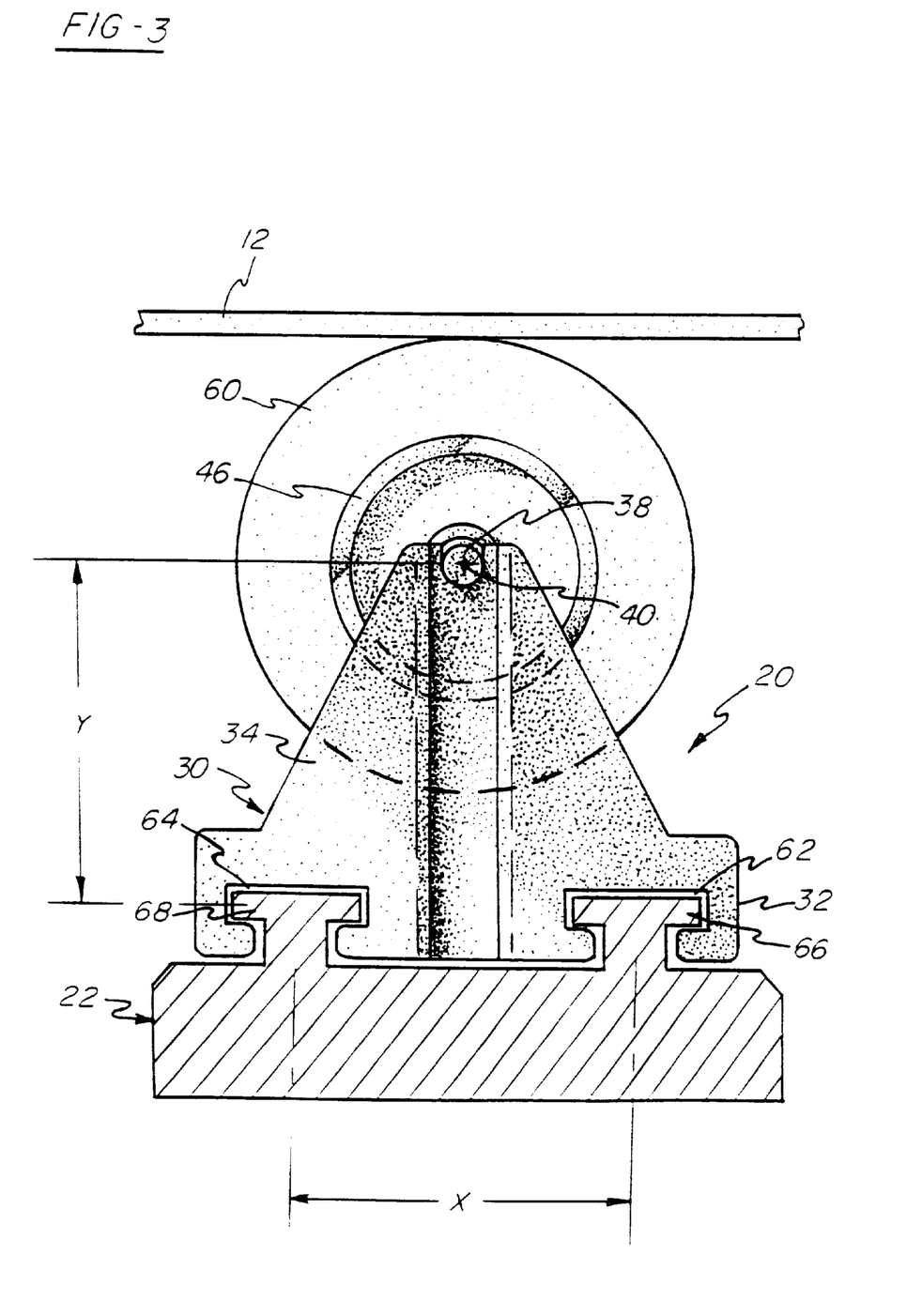
FIG. 3 is a side elevational, partially cut-away view of a roller module on the support member.
Figure 4:
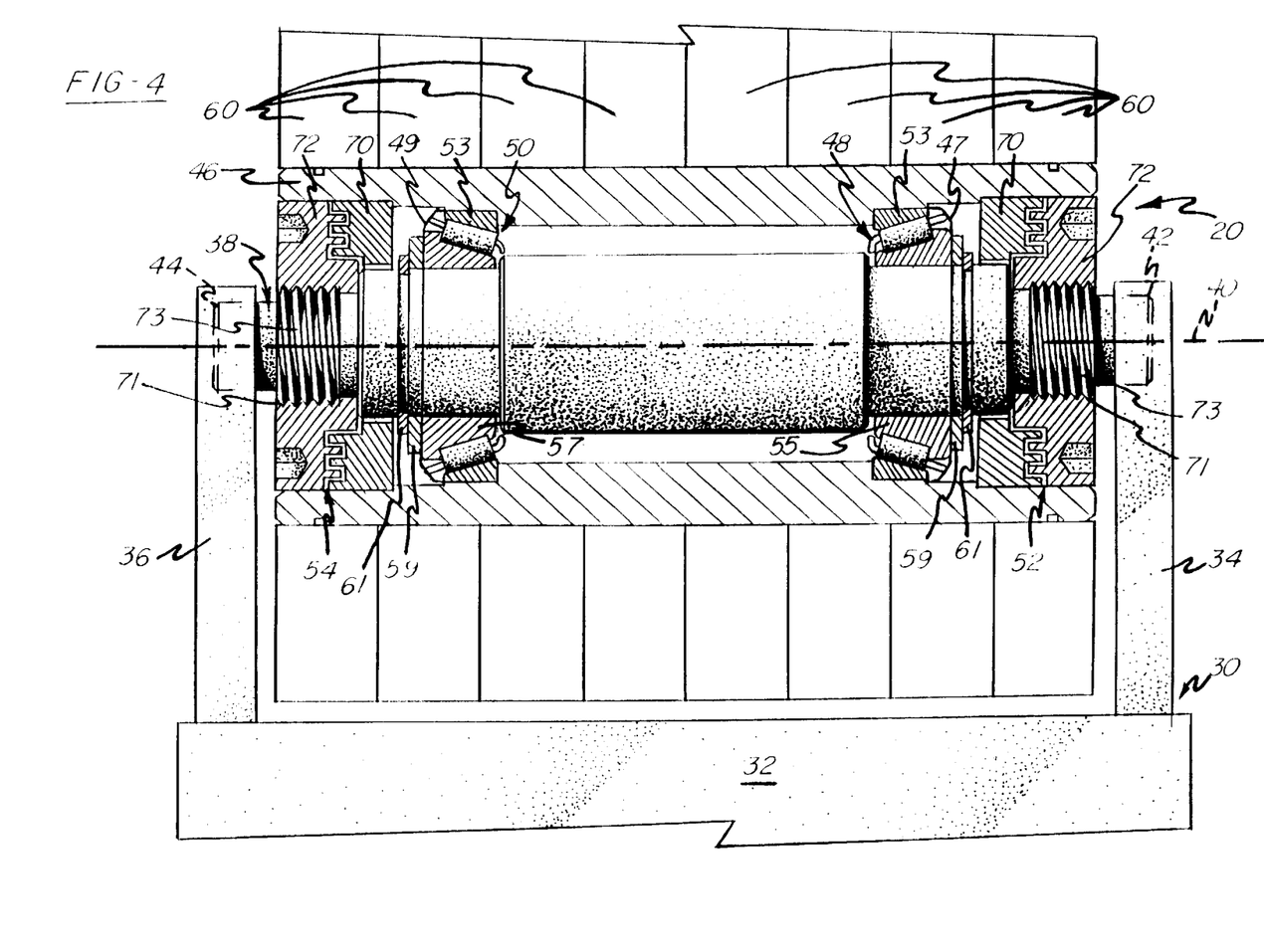
FIG. 4 is a front elevational, partially cut-away view of a roller module.

Referring to FIGS. 3 and 4, each roller module 20 includes a frame 30 comprising a base portion 32 and upwardly extending first and second end plates 34 and 36 rigidly connected to opposing ends of the base portion 32. A support shaft 38 defines a longitudinal axis of rotation 40 extending through the end plates 34, 36, and the support shaft 38 includes first and second ends 42 and 44 supported within apertures defined in upper ends of the respective first and second end plates 34, 36.

A roller shell 46 is supported for rotation on the shaft 38 by tapered roller bearings 48, 50. The roller bearings 48, 50 are isolated from the ends of the shaft 38 by respective Nilos seals 47, 49 extending from an interior surface of the shell 46 to the shaft 38 whereby grease is retained in the bearings 48, 50 and the bearings are protected from contamination from debris. In particular, the seals 47, 49 include outer edges in engagement with respective outer rings 51, 53 of the bearings 48, 50, and inner edges in engagement with respective inner rings 55, 57 of the bearings 48, 50.

The bearings 48, 50 are each maintained in position by a thrust washer 59 supported on the shaft 38 in abutting engagement against each of the inner rings 55, 57 by means of retaining rings 61. In addition, debris and dust is further prevented from entering into the bearings 48, 50 by labyrinth seals 52, 54 located adjacent respective bearings 48, 50 at the ends 42, 44 of the shaft 38, as will be described in further detail below.

The outer surface of the shell 46 supports a plurality of disc members 60 which are formed of an elastomeric material, and most preferably are formed of rubber. The disc members 60 define an outer diameter of about 5 to 6 inches for the outer rotating surface of the roller module 20, and engages a lower surface of the upper run of the conveyor belt 12 to support the conveyor belt 12 as it transports bulk material through the impact zone 14.

The base portion 32 includes an attachment structure defined by a pair of slots 62, 64 (FIG. 3) extending longitudinally along the length of the base portion 32 parallel to the longitudinal axis 40. The slots 62, 64 are spaced from each other on either side of the longitudinal axis 40 and each slot 62, 64 generally defines a T-shaped profile, as seen in an end view. The support structure 22 is provided with an upwardly extending corresponding structure for engaging within the slots 62, 64, and more particularly is provided with upwardly extending T-shaped tongue members 66, 68 for interengaging with the slots 62, 64. The interengaging mounting of the base portion 32 on the support member 22 provides a sliding mounting for the roller units 20 wherein the roller units are mounted to the support member 22 by sliding the units 20 onto either end 24, 26 of the support member 22, and may be held thereon by end plates 69, 71. As previously noted, there is a small angular change from one roller unit 20 to the next to provide a smooth contour support surface for the belt 12, and the length of the units 20 is shorter than prior art impact idler rollers, such as those implemented in three roller structures, and the shorter length of the roller modules 20 facilitates sliding movement of the modules 20 around the curvature of the support structure 22.

In the preferred embodiment, five to seven roller modules 20 are provided on the support member 22, depending on the length of the support member 22 and the corresponding width of the conveyor belt 12. It should be noted that each roller unit 20 is provided as a rigid structure providing reduced deflection of the roller as compared to prior art impact idler rolls. Specifically, the structure provided by the present roller module 20 incorporates a unitary frame 30 having wide base incorporating two spaced attachment points at the slots 62, 64 to provide a structure which is resistant to torque forces which may result from impact loads as well as bearing weight loads of the bulk materials carried by the conveyor belt 12. Thus, the rigid frame structure 30 in combination with the short length of the shaft 38, which is typically on the order of 8 inches with a shaft diameter on the order of 1½ inches, provides a high degree of resistance to deflections induced either by direct vertical loads or by sideways loads against either end of the shaft 38. In addition, the center-to-center spacing x between the slots is approximately equal to the distance y of the longitudinal axis of rotation 40 above the slots 62, 64 to define the wide base configuration for the frame 30.

In addition to the frame 30 of the roller module 20 providing improved impact and weight force resisting characteristics, the combination of the plurality of roller modules 20 on the support member 22 provides a further improved force distribution characteristic for the modular roller conveyor system 10. Specifically, the roller modules 20 are positioned in end-to-end abutting contact with each other and, as a result of the slide mounting on the support member 22, are capable of endwise linear movement about the support member 22, and thus are capable of exerting sideways forces upon adjacent roller modules 20. The net effect of such a roller mounting structure is that forces exerted on one roller module 20 will be distributed to other roller modules 20 to thereby decrease the forces carried by any one roller module 20 and thereby contribute to more uniform wear characteristics across all the modules 20 of the modular roller conveyor system 10.

By way of example, when a vertical downward force is exerted on roller module 20a (FIG. 2), 53% of the force will be exerted downwardly perpendicular to the base portion 32, and 47% of the force will be exerted as an axial load parallel to the longitudinal axis of rotation 40 and applied against the adjacent roller module 20b. With regard to vertical loads applied from the conveyor 12 against the roller module 20b, 76% of the load will be transferred to the support member 22 perpendicular to the base portion 32, and 24% of the load will be transmitted sideways parallel to the longitudinal axis 40 and exerted against the side of the center roller module 20c. Accordingly, in addition to providing a plurality of roller modules 20 to share the load, axial loads exerted on each roller module 20 will be transmitted between and shared by adjacent roller modules 20 to provide a net effect of reduced concentrated axial loads, a greater division of the axial load forces, and therefore a longer operating life for each of the modules 20.

The reduced deflection provided by the present roller module design permits incorporation of an improved, close tolerance seal which substantially prevents entry of all debris and dust, and further provides a seal for permanently sealing the bearings and eliminating the need to provide lubrication or servicing to the bearings.

Figure 5:
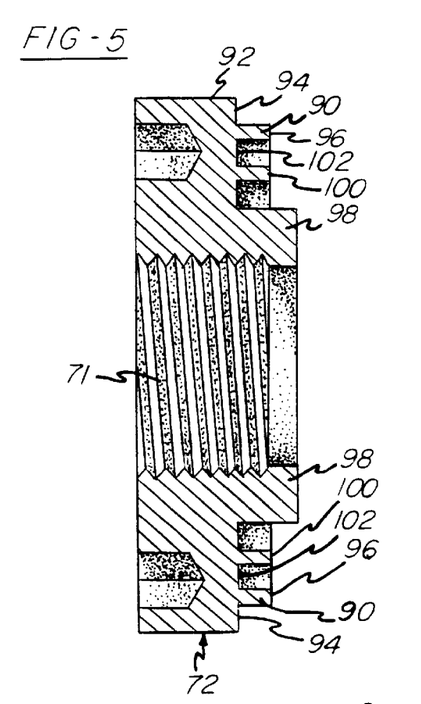
FIG. 5 is a cross-sectional view of an outer member for a labyrinth seal.
Figure 6:
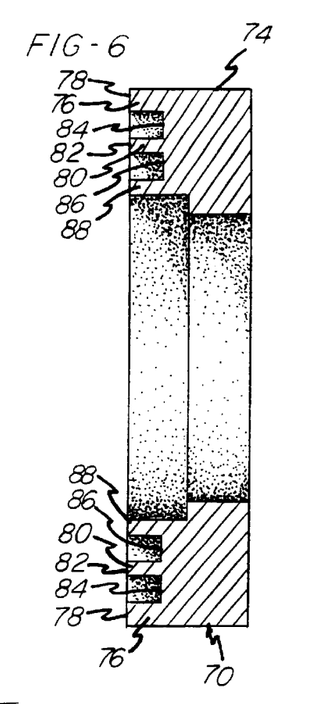
FIG. 6 is a cross-sectional view of an inner member for a labyrinth seal.
Figure 7:
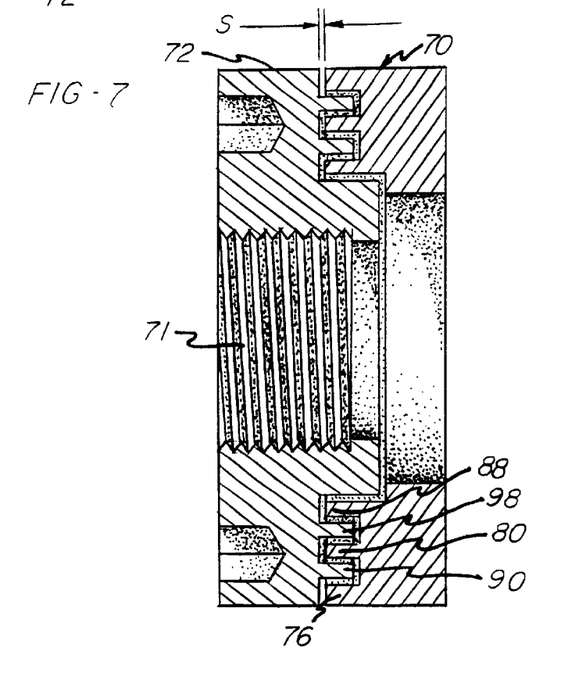
FIG. 7 is a cross-sectional view of the assembled labyrinth seal.

The labyrinth seals 52, 54 are each formed of an inner member 70 and an outer member 72. The inner member 70 includes an outer peripheral surface 74 which is affixed by a press fit to the interior surface of the shell 46 for rotation with the shell 46. The inner member 70 comprises a circumferentially extending first ridge 76 defining a first facing surface 78. A circumferentially extending second ridge 80 extends parallel to and is located radially inwardly from the first ridge 76, and defines a second facing surface 82. A first groove surface 84 is defined between the first and second ridges 76, 80, and a second groove surface 86 is defined radially inwardly from the second ridge 80 and extending axially inwardly from an inner facing surface 88.

The outer member 72 includes an interior threaded surface 71 for engagement with threads 73 defined on either end 42, 44 of the shaft whereby the outer member 72 is affixed to the shaft 38, and an effective barrier is formed for preventing passage of contaminants between the seals 52, 54 and the shaft 38.

The outer member 72 comprises a circumferentially extending first ridge 90 spaced radially inwardly from a peripheral surface 92 and extending axially from an outer groove surface 94. The first ridge 90 of the outer member 72 defines a first facing surface 96 located in facing relationship with the first groove surface 84 of the inner member 70. A circumferentially extending second ridge 98 of the outer member 72 defines a second facing surface 100 located in facing relationship with the second groove surface 86 of the inner member 70. Further, the first facing surface 78 of the inner member 70 is located in facing relationship to the outer groove surface 94 of the outer member 72, and the second facing surface 82 of the inner member 70 is located in facing relationship to an inner groove surface 102 of the outer member 72, located between the first and second ridges 90 and 98.

Of particular importance in the present invention is the spacing between the facing surfaces of the inner and outer members 70, 72 which contributes to the effective permanent sealing of lubrication in the bearings 48, 50. In particular, a spacing s between the ridge facing surfaces 96, 100 of the outer member 72 and the groove facing surfaces 84 and 86 of the inner member 70, as well as the spacing s between the facing surfaces 78, 82 of the inner member 70 and the respective facing groove surfaces 94, 102 of the outer member 72, is approximately 0.0050 inches whereby a very close tolerance seal between the inner and outer members 70, 72 is provided. This close tolerance seal between the inner and outer members 70, 72 is made possible by providing a low deflection support shaft 38 in combination with a supporting frame 30 which is resistant to deflection or deformation in response to loads whereby relative movements between the support shaft 38 and shell 46 is substantially eliminated, and thereby virtually eliminating relative axial movements between the inner and outer seals 70, 72. This close tolerance seal further contributes to the long life of the roller modules 20 used in the present invention in that debris and dust is effectively prevented from entering the bearings 48, 50 to a greater extent than has been provided by prior art end seals.

In view of the above description, it can be seen that the present invention provides an impact idler roller system which provides for extended roller life as a result of the combined beneficial effects of distributing the load carried by the individual rollers and, in association with the improved load distribution, improved sealing characteristics provided by the labyrinth seals 52, 54 which operate to reduce the bearing loads and to reduce the wear effects of debris and dust contact with the bearings.

Further, the design of the present modular roller conveyor system provides a semi-rigid mounting for the roller modules 20 on the support member 22 which, as described above, provides for force distribution in an axial direction as a result of the sliding mounting of the roller modules on the support member, and additionally the sliding mounting facilitates removal and installation of the roller modules to reduce down time when it is necessary to remove and inspect or replace the roller modules, thereby improving operating efficiency.

Also, it should be noted that in accordance with the present construction, three way cushioning of impact loads transmitted from the conveyor belt to the roller modules is provided in that the impact loads are absorbed by 1) the rubber discs surrounding the shell of the roller module, 2) the frame for the roller module which is formed as an integral structure of the base portion and end plates for holding the support shaft, and 3) the semi-rigid mounting of the roller modules on the support member which permits movement of the roller modules against each other to transmit forces between roller modules.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A modular roller conveyor system for an impact zone of a conveyor, said modular roller conveyor system comprising:
    a roller module including a frame comprising a base portion and upwardly extending end plates rigidly connected to opposing ends of said base portion, and a shell supported for rotation about a longitudinal axis of rotation between upper ends of said end plates for supporting engagement with a conveyor belt;
    a support member located below said base portion and extending generally parallel to said longitudinal axis of rotation, and
    said base portion including an attachment structure engaging a cooperating structure on said support member, said cooperating structure substantially constraining said base portion against movement in a horizontal direction perpendicular to said longitudinal axis and permitting said base portion to move in a direction parallel to said longitudinal axis to provide a degree of movement for said roller module relative to said support member.

2. The modular roller conveyor system of claim 1 wherein said attachment structure and said cooperating structure provide said roller module with a degree of movement in a vertical direction.

3. The modular roller conveyor system of claim 1 wherein said attachment structure and cooperating structure comprise inter-engaging slot and tongue members.

4. The modular roller conveyor system of claim 3 wherein said attachment structure comprises a pair of spaced slots extending parallel to said longitudinal axis and said cooperating structure comprises said tongue members extending upwardly into said slots.

5. The modular roller conveyor system of claim 4 wherein said slots define a T-shaped profile and said tongue members define a corresponding T-shaped profile.

6. The modular roller conveyor system of claim 4 wherein said slots are spaced horizontally a distance approximately equal to a vertical distance of said longitudinal axis from said slots.

7. The modular roller conveyor system of claim 1 in combination with a conveyor belt passing through a load impact zone for loading material on said conveyor belt wherein said modular roller conveyor system is located in said load impact zone.

8. A modular roller conveyor system for an impact zone of a conveyor, said modular roller conveyor system comprising:
    a roller module including a frame comprising a base portion and upwardly extending end plates rigidly connected to opposing ends of said base portion, and a shell supported for rotation about a longitudinal axis of rotation between upper ends of said end plates for supporting engagement with a conveyor belt;
    a support member located below said base portion and extending generally parallel to said longitudinal axis of rotation,
    a plurality of said roller modules being supported on said support member in abutting, end-to-end relation wherein said roller modules are movable relative to each other in a linear direction, responsive to a load on the conveyor belt during operation of said conveyor system whereby axial loads, parallel to said longitudinal axis of rotation, are transmitted sideways between said roller modules;
    said base portion including an attachment structure engaging a cooperating structure on said support member wherein said base portion is substantially constrained against movement in a horizontal direction perpendicular to said longitudinal axis, and is movable in a direction parallel to said longitudinal axis to provide a degree of movement for said roller module relative to said support member.

9. The modular roller conveyor system of claim 8 wherein said end plates of said frame for each of said roller modules are spaced apart a distance substantially corresponding to a distance in a range of one-fifth to one-seventh the length of said support member.

10. The modular roller conveyor system of claim 9 wherein each said roller module comprises a support shaft having opposing first and second ends engaged with said end plates and bearings located adjacent ends of said shell, and a labyrinth seal located between said bearings and said ends of said shell, each said labyrinth seal comprising an inner member and an outer member;
    said inner member being affixed to said shell for rotation with said shell and comprising a circumferentially extending first ridge defining a first facing surface, a circumferentially extending second ridge located radially inwardly from said first ridge and defining a second facing surface, a first groove surface defined between said first and second ridges, and a second groove surface defined radially inwardly from said second ridge;
    said outer member being affixed to said support shaft and comprising a circumferentially extending first ridge defining a first facing surface located in facing relationship with said first groove surface of said inner member, a circumferentially extending second ridge located in facing relationship with said second groove surface; and wherein said ridges of said outer member are located approximately 0.0050 inches from said groove surfaces of said inner member to define a close tolerance seal between said inner and outer members.

11. A modular roller conveyor system including a plurality of roller modules for use in an impact zone of the roller conveyor system, said roller module comprising:

a support shaft defining a longitudinal axis of rotation and including first and second shaft ends;

a shell supported on said support shaft for rotation about said longitudinal axis of rotation;

a frame supporting said support shaft, said frame including first and second end plates, each said end plate having an upper end and a lower end, said upper ends each supporting a respective one of said first and second ends of said shaft, said frame further including a base portion extending parallel to said longitudinal axis of rotation and having opposing ends rigidly connected to a respective one of said lower ends of said first and second end plates; and said base portion including an attachment structure located substantially between said first and second end plates for attaching said base portion to an underlying support member for supporting engagement of said shell with a conveyor belt;

wherein said attachment structure comprises a pair of spaced, elongated slots extending between said first and second end plates for engaging an elongated cooperating structure on the underlying support member in sliding engagement whereby torque load on said shaft is minimized.

12. The roller module of claim 11 including bearings located adjacent ends of said shell, and a labyrinth seal located between said bearings and said ends of said shell, each said labyrinth seal comprising an inner member and an outer member;

said inner member being affixed to said shell for rotation with said shell and comprising a circumferentially extending first ridge defining a first facing surface, a circumferentially extending second ridge located radially inwardly from said first ridge and defining a second facing surface, a first groove surface defined between said first and second ridges, and a second groove surface defined radially inwardly from said second ridge;

said outer member being affixed to said support shaft and comprising a circumferentially extending first ridge defining a first facing surface located in facing relationship with said first groove surface of said inner member, a circumferentially extending second ridge located in facing relationship with said second groove surface, and wherein said ridges of said outer member are located approximately 0.0050 inches from said groove surfaces of said inner member to define a close tolerance seal between said inner and outer members.

13. The roller module of claim 11 wherein said slots define a T-shaped profile for engaging cooperating structure on the support member provided with a corresponding T-shaped profile.

14. The roller module of claims 11 including a plurality of rubber rings positioned extending around said shell for absorbing impact forces transmitted from material loaded on a conveyor belt supported by said shell.

15. A modular roller conveyor system in combination with a conveyor belt and load impact zone for loading material on said conveyor belt, said modular roller conveyor system comprising an elongated support member extending transversely of a direction of conveyance for said conveyor belt, a plurality of modular roller units located in end-to-end abutting engagement with each other on said support member, each said modular roller unit including a roller support frame having an elongated base portion and upwardly extending end plates at opposing ends of said base portion supporting a shaft and a rotatable shell in supporting engagement with an underside of said conveyor belt, said base portion including slots extending in the direction of elongation of said base portion, said support member including upwardly extending cooperating structure engaging within said slots such that each modular roller unit is supported for sliding movement in said direction transverse to said direction of conveyance of said conveyor belt whereby axial loads. parallel to an axis of rotation of said shell, are transmitted sideways between said roller modules to provide a reduction of forces exerted on each said modular roller unit through movement of said roller units in response to material impact loads on said conveyor belt.

16. The system of claim 15 wherein said support member is defined as an upwardly curved structure having transverse end portions located adjacent lateral sides of said conveyor belt which are elevated in relation to the transverse middle of said support member.

17. The system of claim 15 including a covering of elastomeric material extending around each of said shells whereby three-way cushioning of impact loads on said conveyor belt is provided by 1) said covering of elastomeric material, 2) said roller support frame, and 3) said movement of said modular roller units on said support member as loads are transmitted to said support member.

18. A modular roller conveyor system comprising an elongated support member extending transversely of a direction of conveyance and a plurality of roller modules supported on said support member in abutting end-to-end relation; each said roller module including an elongated base portion, upwardly extending end plates and a rotatable shell supported between said end plates for rotation about an axis extending transversely of the direction of conveyance; said roller modules being movable relative to each other in a linear direction responsive to a load supported by said plurality of roller modules.

* * * * *